(12) United States Patent
Frankkila et al.

(10) Patent No.: US 9,307,079 B2
(45) Date of Patent: Apr. 5, 2016

(54) HANDLING ANNOUNCEMENT MEDIA IN A COMMUNICATION NETWORK ENVIRONMENT

(75) Inventors: Tomas Frankkila, Luleå (SE); Daniel Enström, Gammelstad (SE); Ingemar Johansson, Luleå (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 494 days.

(21) Appl. No.: 12/518,222

(22) PCT Filed: Nov. 30, 2007

(86) PCT No.: PCT/SE2007/001061
§ 371 (c)(1),
(2), (4) Date: Jun. 8, 2009

(87) PCT Pub. No.: WO2008/069723
PCT Pub. Date: Jun. 12, 2008

(65) Prior Publication Data
US 2010/0017509 A1  Jan. 21, 2010

Related U.S. Application Data

(60) Provisional application No. 60/869,162, filed on Dec. 8, 2006.

(51) Int. Cl.
*G06F 15/16*  (2006.01)
*H04M 3/487*  (2006.01)
*H04M 7/00*  (2006.01)

(52) U.S. Cl.
CPC .............. *H04M 3/487* (2013.01); *H04M 7/006* (2013.01); *H04M 2203/352* (2013.01)

(58) Field of Classification Search
USPC .................................. 709/224, 230, 219, 227
See application file for complete search history.

(56) References Cited

U.S. PATENT DOCUMENTS

| 6,975,624 B1 | 12/2005 | Oda et al. |
| 7,796,603 B1 * | 9/2010 | Bertone et al. ............. 370/395.2 |

(Continued)

FOREIGN PATENT DOCUMENTS

| JP | 2003-258996 A | 9/2003 |
| JP | 2004-274151 A | 9/2004 |

(Continued)

OTHER PUBLICATIONS

3GPP. 3$^{rd}$ Generation Partnership Project; Technical Specification Group Core Network; IP Multimedia (IM) Session Handling; IM Call Model; Stage 2 (Release 6). 3GPP TS 23.218 v6.4.0 (Jun. 2006).

*Primary Examiner* — Jude Jean Gilles

(57) ABSTRACT

In order to efficiently handle the switch between user media and announcement media, a basic step is to first determine a configuration of the user media. Next, a configuration of the announcement media to be presented is determined based on the determined user media configuration. Subsequently, the announcement media is configured according to the announcement media configuration, and the configured announcement media is finally sent to the intended user. In this way, the overall appearance or sound of the announcement will be virtually the same as or at least similar to the overall appearance or sound of the user media, preferably without distortions. This allows the user to perceive the announcement as clearly as possible.

22 Claims, 9 Drawing Sheets

(56) References Cited

U.S. PATENT DOCUMENTS

| | | | |
|---|---|---|---|
| 8,249,076 B1* | 8/2012 | Bertone et al. | 370/395.2 |
| 2003/0018917 A1* | 1/2003 | Brown, Sr. | 713/201 |
| 2005/0076108 A1* | 4/2005 | Li et al. | 709/223 |
| 2005/0169244 A1 | 8/2005 | Luken | |
| 2006/0018451 A1 | 1/2006 | Usuba et al. | |
| 2008/0052741 A1* | 2/2008 | Dharmaji | 725/32 |
| 2008/0077410 A1* | 3/2008 | Ojala et al. | 704/500 |

FOREIGN PATENT DOCUMENTS

| | | |
|---|---|---|
| WO | WO 00/31933 A1 | 6/2000 |
| WO | WO 00/33534 A1 | 6/2000 |

* cited by examiner

HANDLING ANNOUNCEMENT MEDIA IN A COMMUNICATION NETWORK ENVIRONMENT

This application claims the benefit of U.S. Provisional Application No. 60/869,162, filed Dec. 8, 2006, the disclosure of which is fully incorporated herein by reference.

TECHNICAL FIELD

The present invention generally relates to announcement technology in a modern communication network, and more particularly to handling of announcement media and issues related to the switching between user media and announcement media.

BACKGROUND

Announcements play an important role in communication services such as telephony services. Announcements are normally pre-recorded or machine-generated media. Machine-generated media can, for example, be generated with a text-to-speech function (a.k.a. speech synthesis) or text-to-image. The announcements may be generated in the communication network or by the remote user's switchboard or computer.

Usage examples of announcements from the communication network include:
  Error messages when the command that the user has initiated cannot be completed. For example: when the caller has suppressed presentation of the phone number and the answerer has defined that he will not answer calls without seeing the phone number, then the system must present an error message to the caller.
  When a user puts the session on hold, the system may play a message or music-on-hold to the other user.
  In a conference call, the conference server may present an announcement when a new user enters or when a user leaves the session, for example: "John Smith has entered the meeting" and "John Smith has left the meeting".
  A user has a pre-paid subscription that is running empty. The operator can restrict the usage due to a low amount and wants to announce that at session start or during the session (it might be a very long session).
  A method that is used more and more on the Internet is to present an image with a pin code (or password) on a web page. The image of the pin code is distorted so much that automatic text recognition systems should not be able to detect the pin code while it should still be possible for a clever human to read the letters and numbers. This is used instead of sending the corresponding pin code with an (insecure) e-mail.
Usage examples of announcements from the answerer are:
A user calls a travel agency to book a ticket. The following scenario is likely:
  1. The user talks with a travel agent to find the best traveling option. In this step, the discussion is between two humans.
  2. After deciding on the travel, the user is requested to key in his credit card number. This is a man-machine communication where the user hears pre-recorded or machine-generated messages and presses the telephone buttons (0-9) to insert his numbers. In this process the following sentence probable: "Key in your credit card number", "You have entered: 1234 5678 9012 3456. If this is correct then press 1, if not then press 2.", "Insert the expiration date of your credit card", "You have entered: Jan. 1, 2007". These sentences will be generated by the announcement server.
  3. After keying in the credit card number and other required data, the session continues with the travel agent in order to decide on further travel options.
  4. These steps may be repeated multiple times.
A user calls a service desk or contact center to fix some problems after buying a new computer. The service desk uses a screening process to classify the problem before connecting to the call to a technician. In this screening process, the user has to answer questions like: "If your problem is software related then press '1' and hash. If it is hardware related then press '2'. If it is unknown then press '3'". After this screening process, the session will be put on hold and a waiting message is played to the user. The technician may answer the call and may interrupt the waiting message at any point in time.

Traditionally, the generation of informational messages such as prompts and voice announcements has been performed by relatively simple Time Division Multiplexing (TDM) based announcement machines in circuit-switched systems, using conventional Pulse Code Modulation (PCM) or Adaptive Differential PCM (ADPCM) for encoding and decoding purposes. In modern and future communication systems, the conditions and requirements for handling announcements will change dramatically, and there is thus a general need to provide solutions for efficiently handling announcement media in such communication systems.

SUMMARY

The present invention overcomes these and other drawbacks of the prior art arrangements.

It is a general object of the present invention to improve the handling of announcement media in a communication network environment.

It is an object of the invention to efficiently handle switching between user media and announcement media without annoying transitions and/or distortions, or at least to reduce distortions caused by the switching.

In particular it is desirable to enable users to perceive announcements as clearly as possible.

In particular, it is a specific object to provide an improved method and system for switching between user media and announcement media.

It is another specific object to provide an improved announcement server for a communication network.

These and other objects are met by the invention as defined by the accompanying patent claims.

It has been recognized by the inventors that the wide range of different configurations of media offered by modern communication networks may cause problems for the announcement servers since the overall sound or appearance of the announcement media may turn out to be very different compared to the sound or appearance of the normal user media. This can be very annoying for the user.

In order to handle the switch between user media and announcement media, a basic idea of the invention is to first determine a configuration of the user media, and then determine a configuration of the announcement media to be presented based on the determined user media configuration. Subsequently, the announcement media is configured according to the announcement media configuration, and the configured announcement media is sent to the intended user. In this way, the overall appearance or sound of the announcement will be virtually the same as or at least similar to the overall appearance or sound of the user media, preferably without distortions, allowing the user to perceive the announcement as clearly as possible.

It should though be understood that the invention is not limited to speech or audio, but can be applied to video as well.

Normally, the user media comes from another remote user, and the announcement media comes from an announcement server or processor. However, it can be noted that the announcement server may be located at the network side as a network-based announcement server, or at the user side in connection with the remote user e.g. in the user equipment or in a Private Branch eXchange (PBX).

In a preferred, exemplary embodiment of the invention, the setup of a communication session for user media between the considered users is monitored to identify one or more valid user media configurations from which a suitable user media configuration can be selected or otherwise determined.

Preferably, the user communication is monitored to detect a currently used user media configuration, allowing the announcement media configuration to be matched to the current user media configuration. The configured announcement media is then preferably forwarded to the intended user by letting the announcement server insert the configured announcement media in the session. Alternatively, the announcement media is sent in parallel with the user media, for example by establishing a new session for the announcement media.

Preferably, a codec and/or transport format configuration is determined for the user media, and the announcement media configuration is then determined based on a matching of the codec and/or transport format configuration of the announcement media to the codec and/or transport format configuration of the user media.

In a further aspect, the invention relates to an announcement server for a communication network. Basically, the announcement server is configured for obtaining media configuration information representative of a configuration of user media in a communication session in the network, and for configuration of announcement media to be inserted in the session based on the media configuration information. In addition, the announcement server is operable for inserting the configured announcement media in the session.

Other advantages offered by the invention will be appreciated when reading the below description of embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figure 1:
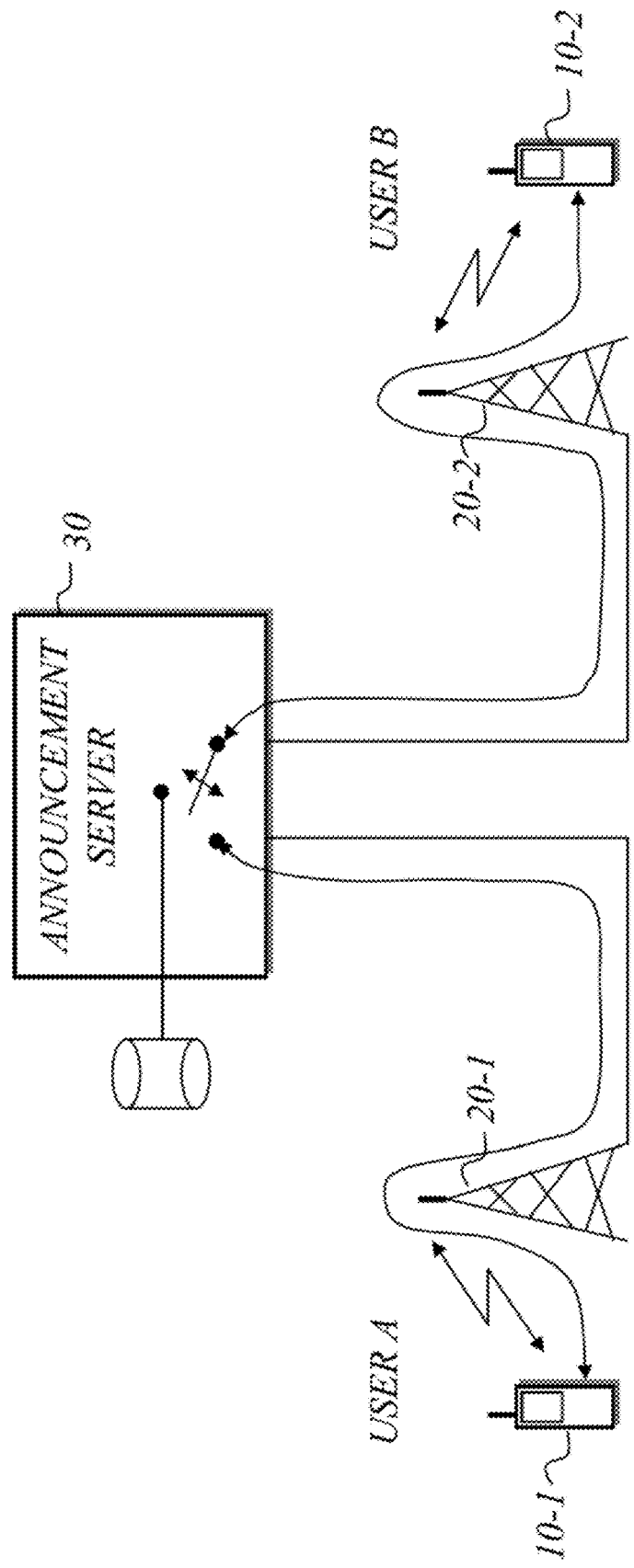
FIG. 1 is a schematic diagram illustrating an exemplary system overview.

Throughout the drawings, the same reference characters will be used for corresponding or similar elements.

For a better understanding of the invention it may be useful to begin with a brief system overview.

FIG. 1 is a schematic diagram illustrating an exemplary system overview. The exemplary system includes the user equipment (UE) 10-1, 10-2 of two end-users A and B communicating via associated base stations 20-1, 20-2 and a network-based announcement server 30. In this case, the media stream such as a Real-Time Protocol (RTP) [1] media stream always goes through the announcement server, which may be a Media Resource Function Processor, (MRFP) [2]. In this example, the announcement server replaces the RTP stream from user A with the announcement, which is referred to as an in-band announcement.

Other ways of introducing announcements are also possible, for example where the media is transmitted directly between A and B, without passing through the announcement server. In this case, the announcement may be sent with a SIP INVITE [3] from the announcement server to UE (User Equipment) B and UE B must drop the media received from UE A in order to generate the media received from the announcement sever. Another alternative is to send a message such as a SIP INFO or SIP NOTIFY message including a link (URL) to the announcement media. In general, an alternative is thus to send the announcement media in parallel to the user media, with or without establishing a new session for the announcement media.

The announcement server may be located in the telecom network. In modern systems such as the IP Multimedia Subsystem (IMS), the announcement server would normally be located in the Media Resource Function Processor (MRFP) but it could also be located in an application server, for example a conference server.

It is also possible to have an announcement server in or close to the end-point, in the user's equipment, in a computer or in a Private Branch eXchange (PBX).

A careful analysis by the inventors has revealed that existing solutions suffer from one or more problems, as described below.

Although announcements work in existing circuit switched systems today, this works well because the used codecs are typically PCM [4] or ADPCM [5]. These codecs are sample-by-sample codecs which either do not use any prediction (PCM) or very limited amount of prediction (ADPCM). This means that the decoder will recover very rapidly from a state mismatch and the likelihood that this will cause an audible distortion is low.

Furthermore, a traditional system uses only one codec, for example either PCM or ADPCM but never both. The system also uses the same transport format during the whole session, e.g. it never adapts codec rate, frame aggregation or redundancy. In fact, the system uses the same configuration for all sessions.

In modern and future systems such as the IP Multimedia Subsystem (IMS), and especially for Multimedia Telephony (MMTel) [6], the situation is completely different. It is possible to send several types of media. The media can be encoded with different codecs and different rates. Different transport formats may also be used, i.e. payload formats, with or without frame aggregation, with or without redundancy, etc. These variations are needed in order to adapt the session so that the risk for network congestion is reduced and so that the session can be maintained, with reasonable quality, even during congestion periods. This is especially important for cellular systems where the radio channel varies significantly. These variations however cause problems for the announcement server. It cannot only encode the announcement media in one single way, as it did before, and hope that the receiver will be satisfied. If the media between UE A and UE B is normally encoded with a wideband codec (AMR-WB) then encoding the announcement with a narrowband codec (Adaptive Multi-Rate; AMR) then the media would sound totally different and the receiving user would question why the announcement sounds so much different from the normal media. In the worst case, the receiving user will be annoyed and may focus more on the media quality than the actual content of the announcement, which means that he may even misunderstand the announcement.

Figure 2:
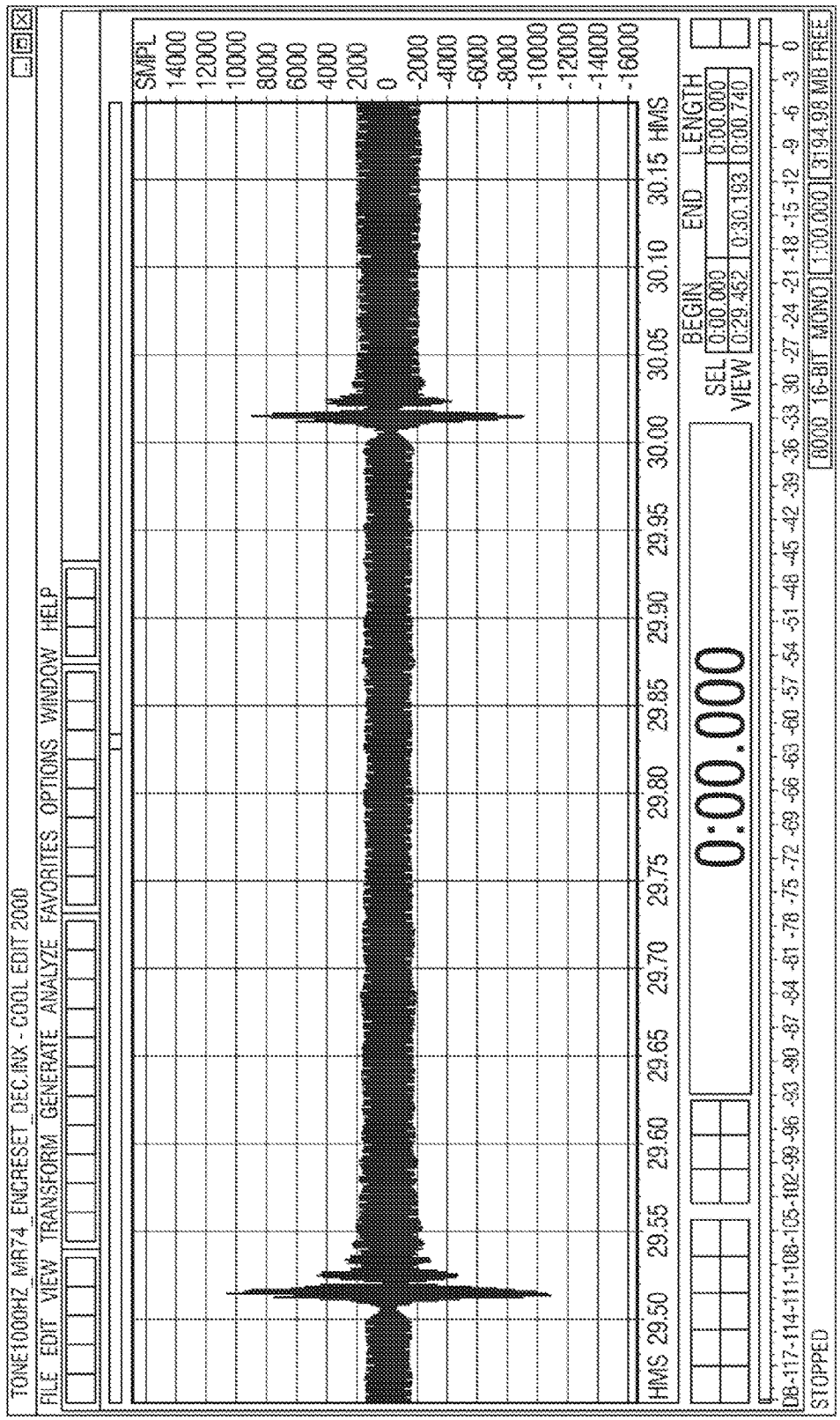
FIG. 2 is a schematic diagram illustrating distortions when the encoder states are reset while the decoder states are not reset.
Figure 3:
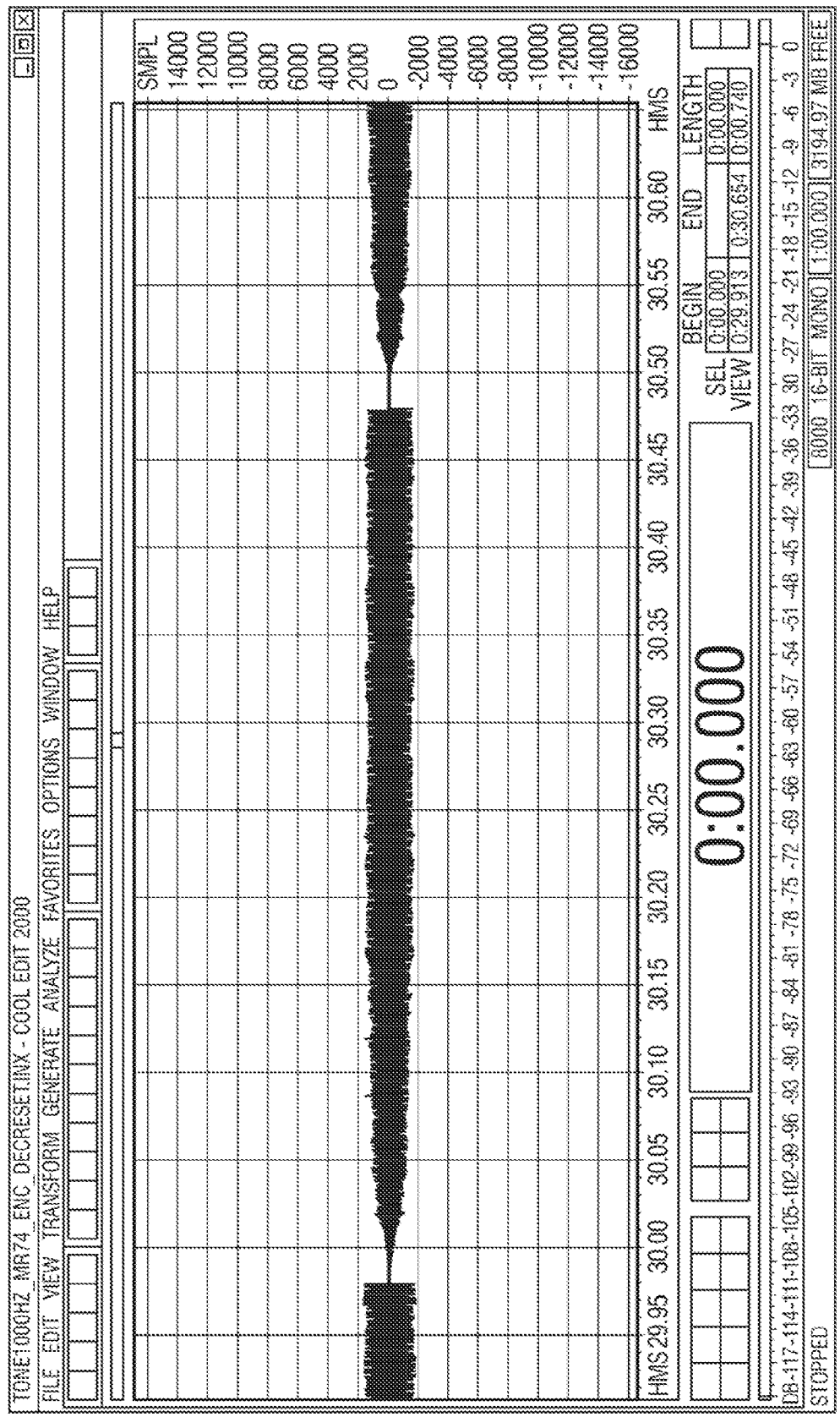
FIG. 3 is a schematic diagram illustrating distortions when the decoder states are reset while the encoder states are not reset.

In addition, the use of modern prediction-based codecs may lead to state mismatches when an announcement interrupts the normal media, resulting in audible distortions that may also be annoying to the user. Prediction is very important for modern codecs, for example for AMR [7] or AMR-WB [8]. Inter-frame prediction is used in order to reduce the bit rate, i.e. high compression ratio, while still providing good quality. The inter-frame prediction requires that states are passed from frame to frame. When an announcement interrupts the normal media, there will be a state mismatch since two different instances of the codec is used, one codec instance in UE A for the speech media from the user and one codec instance in the announcement server. The states in UE A have evolved according to the used prediction while the states in the announcement server start from the initialization states. A state mismatch can cause distortions that are more or less audible depending on the current content. Two examples of such distortions are shown in FIG. 2 and FIG. 3. The distortions are in both cases clearly audible and are easily noticeable by the listener but the spikes in FIG. 2 are much more annoying.

From FIGS. 2 and 3 it can also be seen that it takes about 100-200 ms for the synthesis to recover after an asynchronous reset. A state-less codec such as PCM would instead recover immediately since there is no need to "build up" the states to the proper content.

Traditional circuit switched systems typically also has control over the sound level and adjusts the volume in the network if it is not appropriate. VoIP systems, like Multimedia Telephony, will probably not have such functions since the idea is to send the VoIP packets end-to-end without any transcoding and other kinds of modifications. For VoIP, it is therefore likely that the end users have adjusted the volume quite a lot if the other user is talking loudly or silently. If the announcement server inserts the announcement media without verifying the volume the whole message may be missed because it is presented with a too low volume or because it is presented with such a high volume that the listener must immediately move the phone from his ear.

These problems are not limited to speech. Similar problems occur also for audio and for video. For these cases, one can expect even larger problems since the codecs for these media types typically has an even higher compression ratio than speech codecs and to achieve this compression ratio they rely even more on good quality states.

The embodiments of the invention are related to one or more of these problems.

Initially, examples of illustrative embodiments that are primarily directed to the problem posed by the large variety of potential media configurations in modern communication networks will be described. The problem is that the overall sound or appearance of the announcement media may turn out to be very different compared to the sound or appearance of the normal user media. This can be very annoying for the user.

Figure 4:
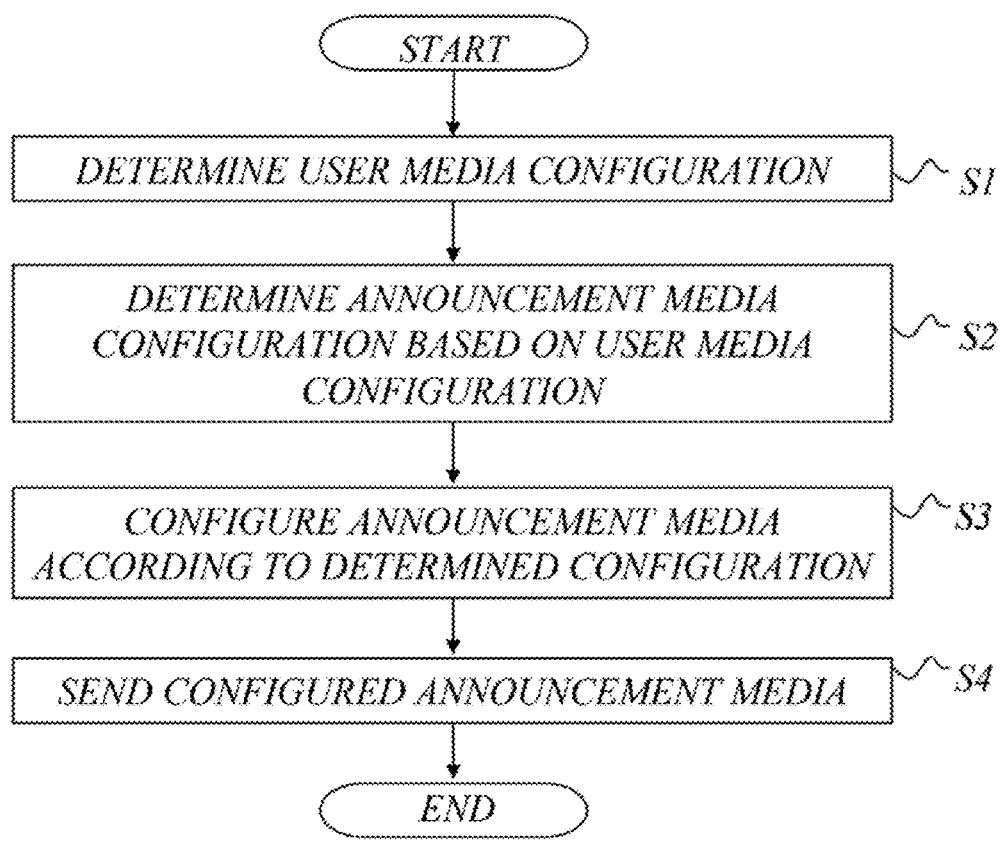
FIG. 4 is a schematic flow diagram of a basic method for switching between user media and announcement media according to an exemplary embodiment of the invention.

FIG. 4 is a schematic flow diagram of a basic method for switching between user media and announcement media according to an exemplary embodiment of the invention. In order to efficiently handle the switch between user media and announcement media, a basic step (S1) is to first determine a configuration of the user media. Next, a configuration of the announcement media to be presented is determined (S2) based on the determined user media configuration. Subsequently, the announcement media is configured (S3) according to the announcement media configuration, and the configured announcement media is finally sent (S4) to the intended user. In this way, the overall appearance or sound of the announcement will be virtually the same as or at least similar to the overall appearance or sound of the user media, preferably without distortions. This allows the user to perceive the announcement as clearly as possible. For example, the user media and announcement media may be in the form of speech, audio or video.

In a preferred, exemplary embodiment of the invention, a codec configuration of the user media is determined, and the codec configuration of the announcement media is then preferably matched to the determined codec configuration of the user media, meaning that the same or at least a similar codec configuration is used for the announcement media. This increases the chances that the two media sound or appear similar to the intended user. For example, the codec configuration may include type of codec and codec mode, and optionally also codec mode switching capabilities.

Further, it is also possible to determine a transport format configuration of the user media, and try to match the transport format configuration of the announcement media to that of the user media. In this way, the announcement media will likely not be severely impacted by transport impairments.

Optionally, a frame aggregation and redundancy format configuration of the user media is determined to enable matching of the frame aggregation and redundancy format configuration of the announcement media to that of the user media.

Figure 5:
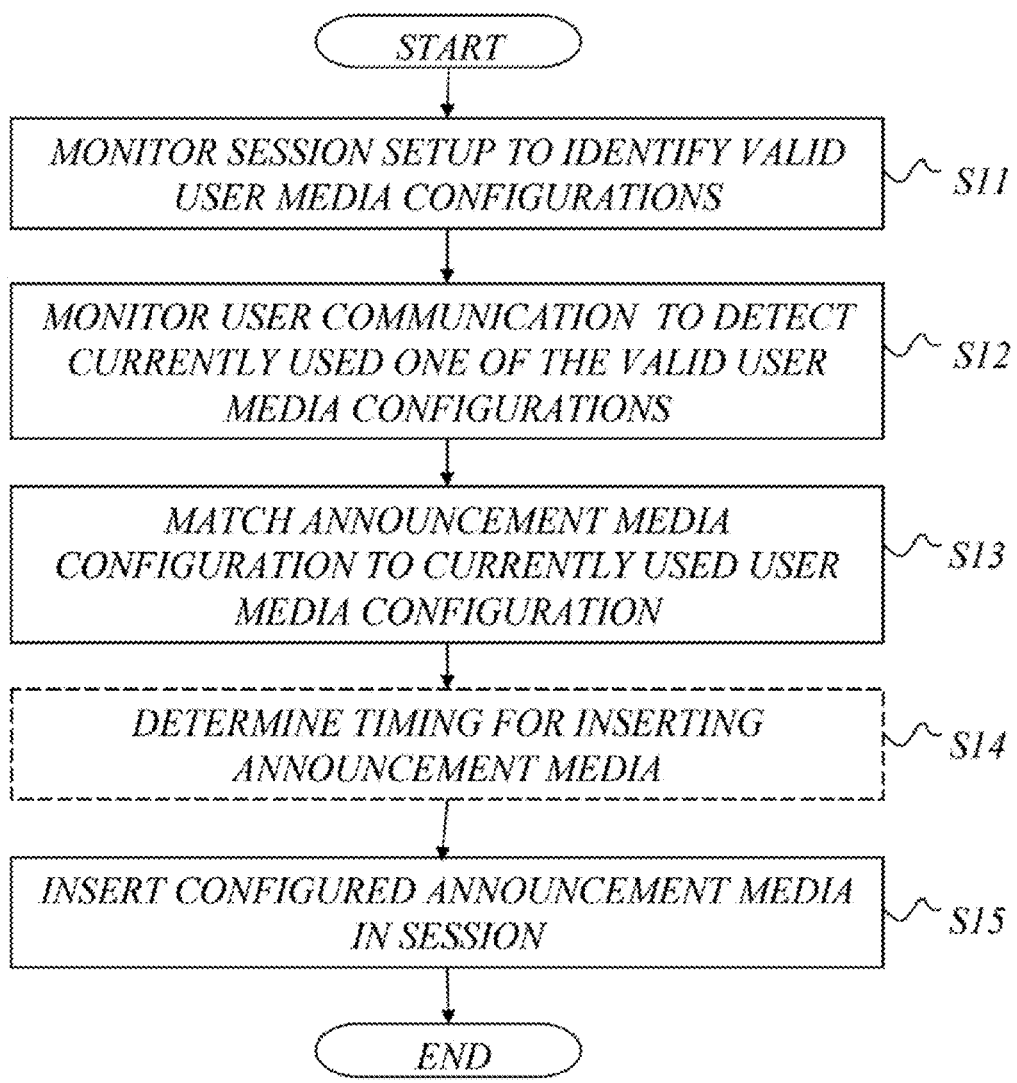
FIG. 5 is a schematic flow diagram of a method for switching between user media and announcement media according to another exemplary embodiment of the invention.

FIG. 5 is a schematic flow diagram of a method for switching between user media and announcement media according to another exemplary embodiment of the invention.

Preferably, the setup of a communication session for user media between the user equipment of the considered users is monitored (S11) to identify one or more valid user media configurations from which a suitable user media configuration can be selected or otherwise determined. Subsequently, the user communication in the session is advantageously monitored (S12) to detect a currently used one of the valid user media configurations. The announcement media configuration is then matched (S13) to the current user media configuration. Optionally, a suitable timing for inserting the announcement media in the session is determined (S14), for example by considering the urgency of the announcement. The configured announcement media is finally forwarded to the intended user by letting the announcement server insert (S15) the configured announcement media in the session. Alternatively, the announcement media is sent in parallel with the user media, for example by establishing a new session for the announcement media, or by simply sending a control message with a link to the announcement media.

In this particular scenario, a basic definition of the session is normally negotiated during session setup, e.g. by using the Session Description Protocol (SDP) in the Session Initiation Protocol (SIP). For example, a number of possible valid media configurations can be defined in the SDP signaling, and associated with respective identifiers. In a particular exemplary embodiment, the field Payload Type of RTP packets can be used to identify media configurations by utilizing the Payload Type number as an identifier. This number can be tied to a valid media configuration. The association of Payload Type numbers and media configurations is preferably made during session setup (e.g. SIP INVITE) and/or at session re-configuration (SIP UPDATE or so-called SIP RE-INVITE). During subsequent communication, when sending media packets such as RTP packets, the Payload Type field can be monitored to extract a Payload Type number, which can then be associated with a currently used media configuration.

By way of example, a media configuration can be defined by one or several of the following information items:
   Codec(s)
      for example: AMR, GSM-EFR (GSM Enhanced Full Rate), EVRC (Enhanced Variable Rate Codec), and so forth.
   Codec Mode(s)
      when applicable;
      for example: for AMR, all 8 codec modes can be allowed, or a subset of codec modes.
   Codec Mode Switching Capabilities
      when applicable;
      for example: for AMR it may be specified that codec mode switching only be allowed between adjacent codec modes, i.e. if by way of example a subset of the AMR codec modes are allowed such as codec modes defined by bit rates 12.2, 7.4, 5.9 and 4.75 kbps, and a switch from the codec mode with bit rate 12.2 to the codec mode with bit rate 4.75 is desired, such a switch has to go through codec modes 7.4 and 5.9.
   Payload Format
      when applicable;
      for example: for AMR, there are two basic options, bandwidth-efficient and octet-aligned.
   Recommended Number of Frames Per Packet this is generally not a strict requirement.
   Maximum Amount of Data Per Packet this is generally a strict requirement.

At session setup, a range of different possible media configurations is therefore normally specified. By simply selecting an arbitrary one of the media configurations negotiated during session setup, it is possible to obtain a decent, but normally sub-optimal solution. If several valid media configurations are allowed, a better solution might be to provide a priority order indicating in which order the various configurations preferably should be used. For example, if the exemplary configurations A, B and C are allowed, it may also be specified in SIP INVITE that the preferred order is B, C, A.

However, by monitoring which configuration(s) that is/are currently used during the user communication, it is possible to optimize the selection of media configuration for the announcement media.

If by way of example, the user clients have sensed a bad channel and adapted to maximum robustness, e.g. by using the lowest possible bit rate and adding redundancy by sending the same frame several times, it would be best if the announcement was processed by using the same or similar configuration. The default configuration would otherwise normally be to start with the highest possible bit rate for speech coding, and subsequently perform adaptation towards higher robustness. This adaptation however normally takes time, and there is a risk that the announcement is already completed before the adaptation has reached the same corresponding robustness level as was used for the user media. By using the invention and monitoring the currently used media configuration, the announcement media configuration can immediately be matched to the user media configuration.

If the announcement server for some reason does not support some or all of the valid media configuration(s) indicated during session setup, a local decision on which media configuration to use can be made in the announcement server based on the (subset of) configurations allowed by the announcement server.

Generally, the user media and the announcement media are intended for a first network element such as the user equipment of a first user. The user media normally comes from a second network element such as the user equipment of another remote user. The announcement media normally comes from a third network element such as an announcement server. However, it should be noted that the announcement server may be located at the network side as a network-based announcement server, or at the user side in connection with the remote user. In the latter case, the second network element and the third network element may coincide, or at least be in close connection to each other. Various exemplary embodiments of the invention will now be described.

Figure 6:
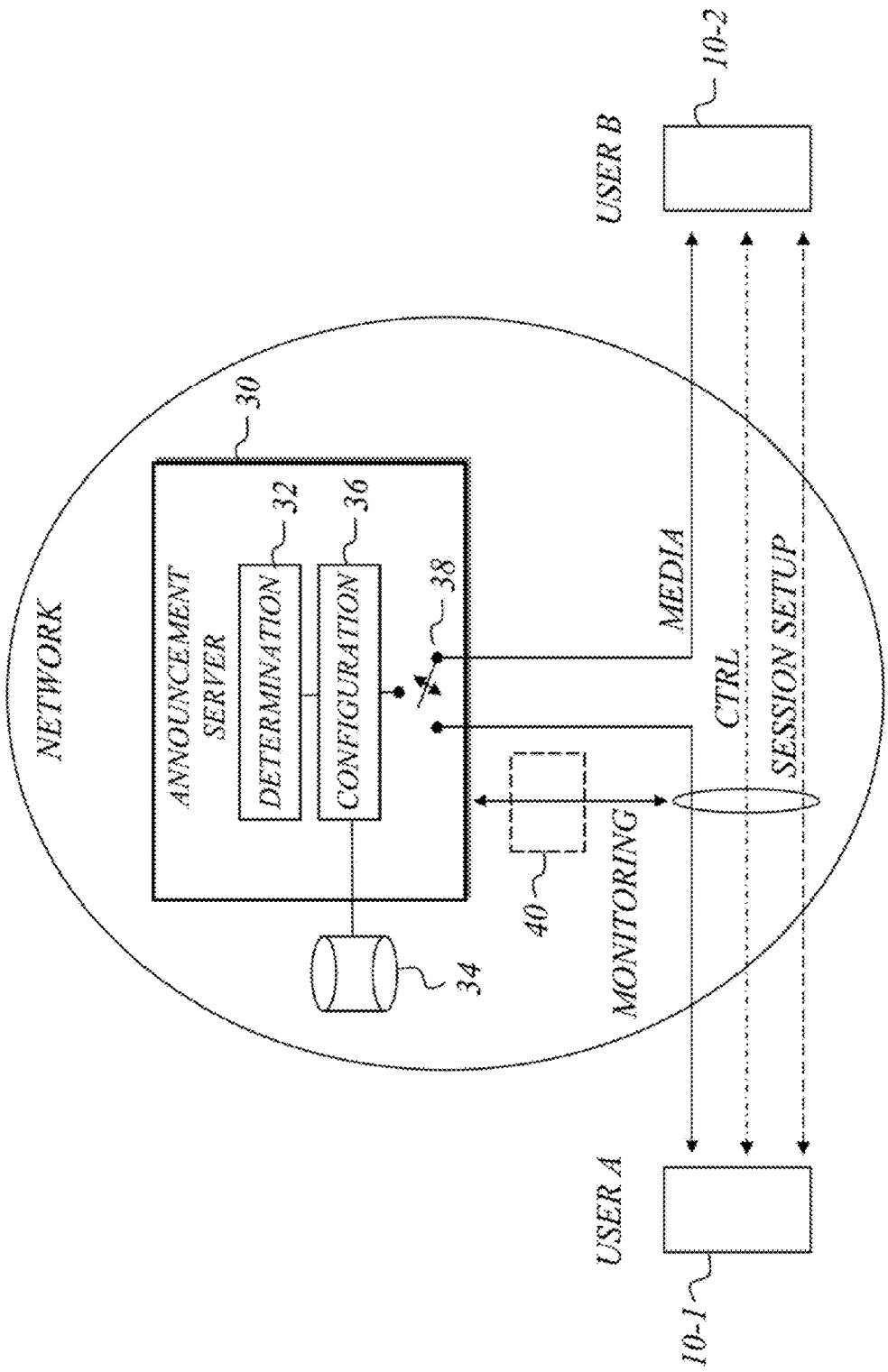
FIG. 6 is a system overview including the network side and the user side according to an exemplary embodiment of the invention.

FIG. 6 is a system overview including the network side and the user side according to an exemplary embodiment of the invention. Basically, the user equipment (UE) 10-1, 10-2 of two users A and B are communicating through a communication network. In this particular example, the communication goes through an announcement server 30, which inserts a suitably configured announcement into the communication between the users. The announcement server 30 comprises a module 32 for determination of user media configuration and announcement media configuration, a database 34 holding one or more pre-recorded or machine-generated announcements, a module 36 for configuration of the announcement media and a controllable switch mechanism 38 for replacing the user media stream with the configured announcement media.

Preferably, the announcement server 30 is configured to monitor the session setup between the users to identify one or more valid user media configurations. Information on valid user media configurations is normally stored together with associated identifiers in a table (not shown) in connection with the announcement server. The announcement server 30 may then select among these media configurations in a number of different ways. In a preferred, exemplary embodiment of the invention, user media packets are monitored during the session to identify a currently used user media configuration. Preferably, this is performed by extracting a media configuration identifier from the packet header of one or more media packets and mapping this identifier to a specific user media configuration stored in the table of valid user media configurations.

Based on information about a specified user media configuration, it is then possible to determine a suitable configuration of the announcement media. Once an announcement media configuration has been determined, a selected announcement retrieved from the database 34, or otherwise generated, may be configured accordingly in the configuration module 36. This typically includes encoding and/or formatting of the announcement media according to the determined configuration. The announcement media may then be inserted into the communication session. Depending on the circumstances, it may or may not be necessary to determine a suitable timing for inserting the announcement, as will be explained in greater detail later on.

It may also be advantageous to monitor further control information during the communication session between the users, and especially feedback information for link adaptation to identify any possible changes to the user media configuration such as a change of codec mode or redundancy mode, allowing adaptation of the configuration of the announcement media according to the most recent information about the user media configuration.

The monitoring may be performed by the announcement server 30 or an optional unit 40 in association with the announcement server.

Figure 7:
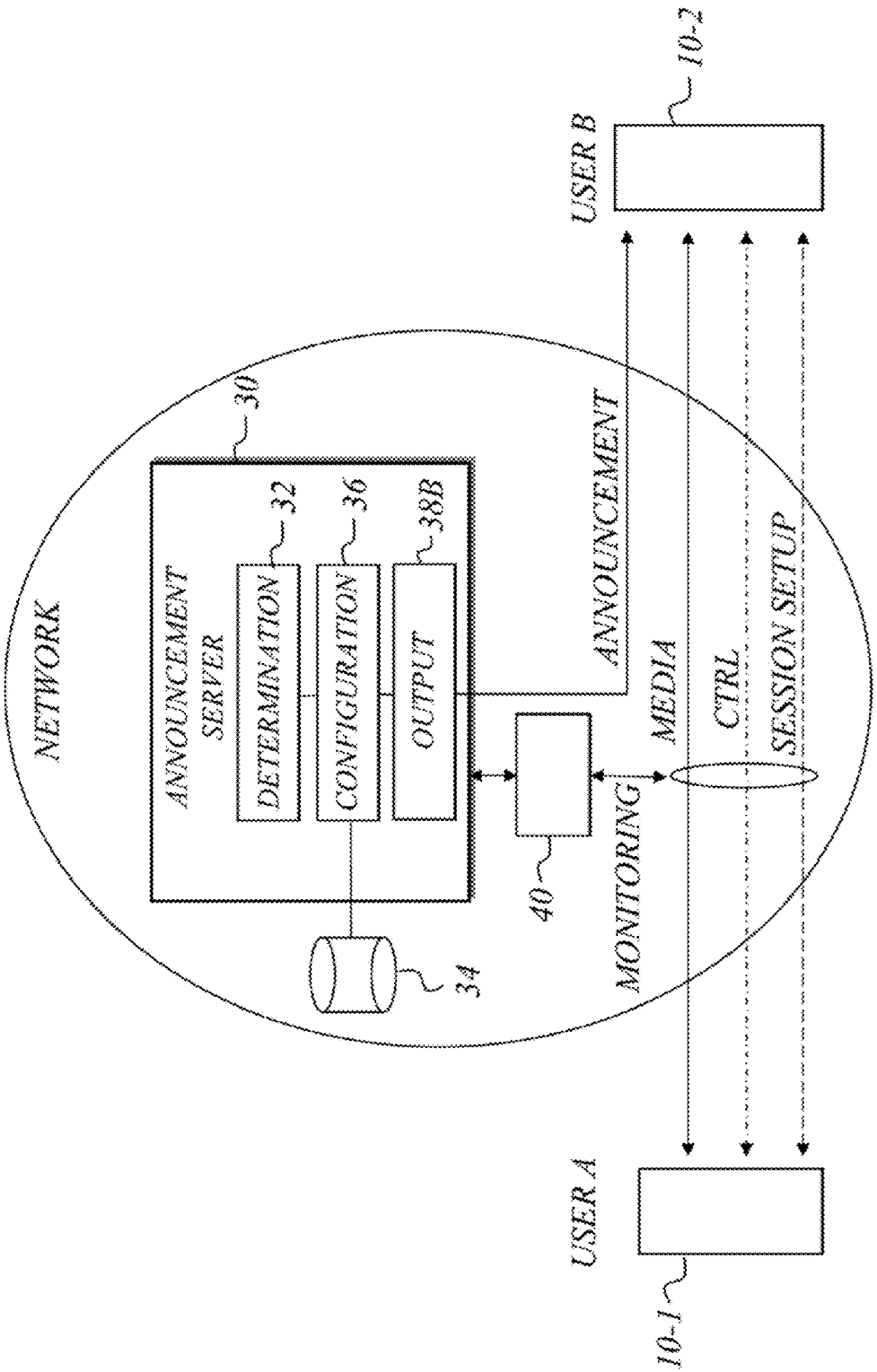
FIG. 7 is a schematic overview according to another exemplary embodiment of the invention.

FIG. 7 is a schematic overview according to another exemplary embodiment of the invention. In this example, user media is transmitted between the users 10-1, 10-2 through the network, but without directly passing the announcement server 30. Preferably, an external monitoring unit 40 monitors the session setup and optionally also the user communication and/or control feedback to provide sufficient information for letting the determination module 32 determine user media configuration and announcement media configuration. An announcement retrieved from the announcement database 34, or otherwise generated, is then configured in the configuration module 36 in accordance with the determined announcement media configuration. The configured announcement may then be sent from an output module 38 to the intended user, e.g. by using a SIP INVITE to establish a new session for the announcement media. The intended user, e.g. user B, must then normally drop the user media from user A to generate the announcement media, unless multiple sessions are supported by the user equipment.

Figure 8:
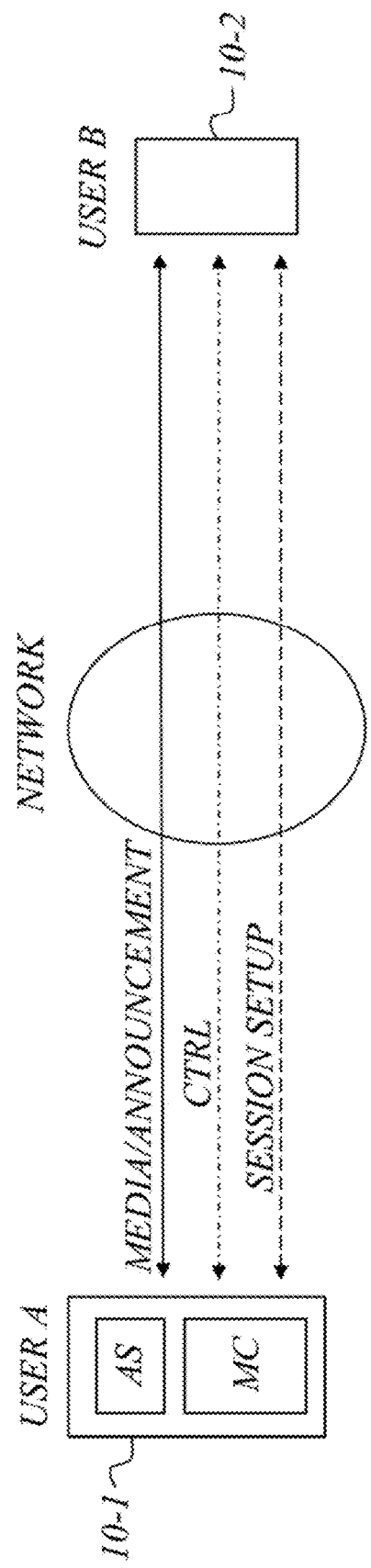
FIG. 8 is a schematic overview according to yet another exemplary embodiment of the invention.

FIG. 8 is a schematic overview according to yet another exemplary embodiment of the invention. In this example, the announcement server resides on the user side. In addition to the normal equipment for user-to-user communication, the overall user equipment (UE) system of user A 10-1 also comprises an announcement server (AS) or equivalent announcement device that is capable of providing announcement media. The overall user equipment system further comprises a media configuration unit (MC). Based on information about the configuration of the user media, the MC unit may then determine a suitable announcement media configuration and configure an announcement to be presented to the other user B 10-2 accordingly. The overall user system may switch from user media to announcement media and back.

In yet another alternative embodiment, the announcement server is implemented in a Private Branch eXchange (PBS) in connection with the end-point.

In fact, there may be more than one announcement server in the considered network system, and the invention is also capable of handling switches between announcement media from a first announcement server and announcement media from a second announcement server in the same or similar way as described above for switches between user media and announcement media. For example, user media from the UE may be replaced by announcement media from an announcement server in a PBX, which may be replaced by announcement media from a network-based announcement server.

In the following, further exemplary embodiments will be described as to how the switching between media from another (human) user and media from an announcement server can be managed.

For example, the users may be involved in a Multimedia Telephony call using IP, UDP and RTP for media transport and SIP for session control. The announcement server may either be located in the telecom network or at the remote party (location).

An overall goal is to ensure that the switching between the two media sources and media types is not annoying. Preferably, this means that the announcement media should be encoded with a similar codec, similar bit rates and should be transported using a similar transport format as the media between UE A and UE B. This also means that the switching should not create any distortions or at least with as small distortions as possible. This may be done by the following exemplary method:

The Announcement Server:
1 Monitors the session setup to determine what codecs that can be used in the session. This is normally static information during the session but it might be modified if any session parameters are re-negotiated during the session.
2 Monitors the media packets and/or the quality feedback in order to determine the currently used codec and transport format. This is temporal information that normally needs to be updated fairly frequently, maybe not for every single packet but at least on a regular basis. The frequency of these updates may depend on the system load. For high system loads and/or varying channel conditions, one can expect that the media between the users needs to be adapted quite frequently. Adaptation should however be fairly infrequent for low system loads.
3. Determines a suitable encoding and transport format for the announcement media.
4 Determines how to create a suitable transition.
 a. If the announcement should use fade-in and fade-out.
 b. If idle periods should be added (silence, blank pictures).
 c. If there is a need to force the decoder to reset (codec homing, ensure that the CRC will fail, and so forth).
5 Determines a suitable timing for when the announcement should be inserted. The timing normally depends on the urgency of the announcement.
6 Inserts the announcement and drops the media from UE A. The volume may need to be adjusted to match that of the media from UE A.
7 After the announcement has been completed it also determines how to create a suitable transition to the media from UE A.

Note that not all of these steps need to be done in this exact order. In some cases it may also be possible to skip some of these steps.

Figure 9:
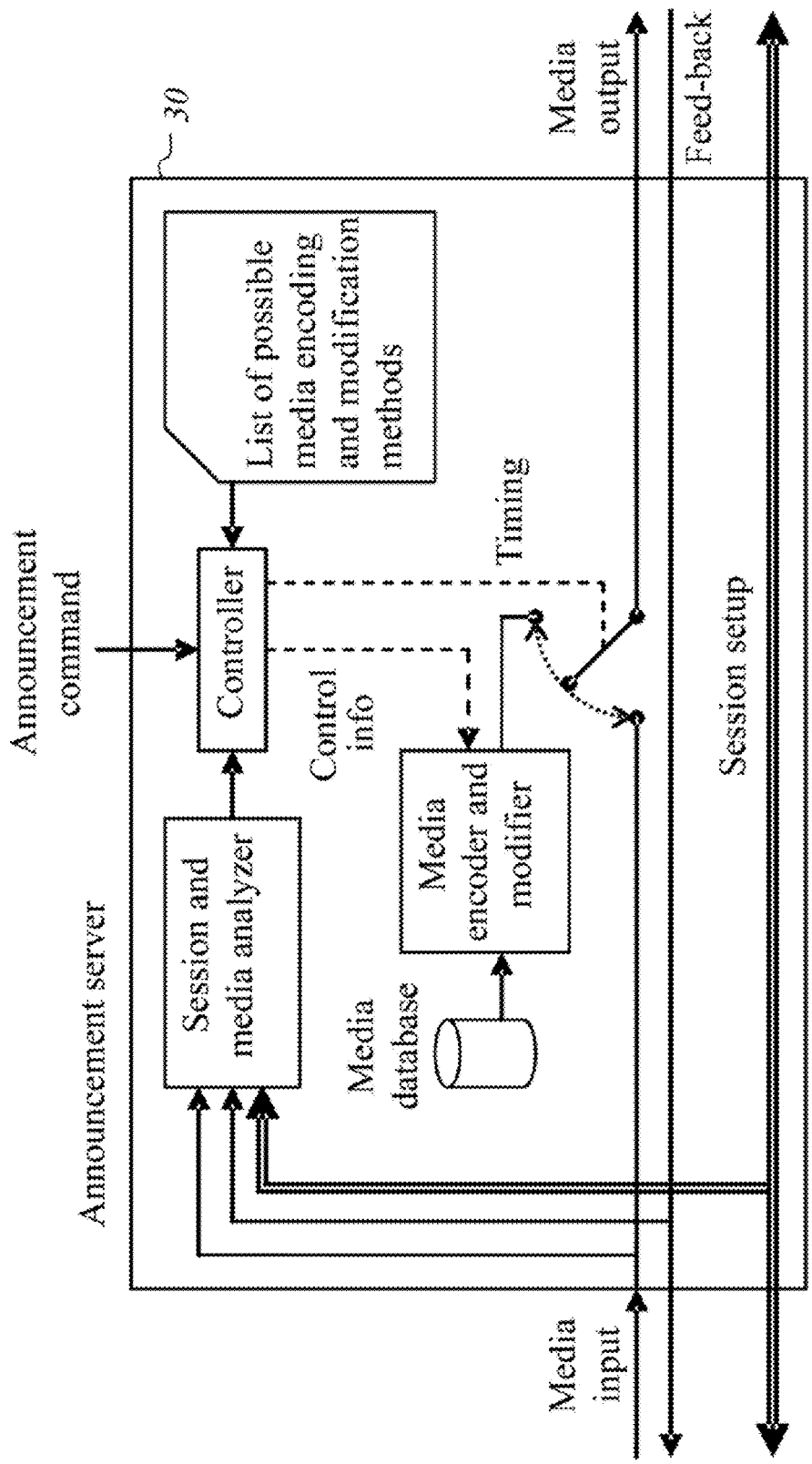
FIG. 9 is a schematic block diagram of an announcement server according to a possible preferred embodiment.

For a better understanding of the invention, an announcement server according to a possible preferred embodiment will now be described in more detail with reference to FIG. 9.

In this particular example, the functionality of the different blocks can be summarized in the following way:
The Session setup between UE A and UE B is preferably made with SIP. This determines what media that can be used in the session, how each media shall be encoded and what transport format to use. Some clarifying examples are:
 If the media is speech and/or video and/or text.
 What codec to use for each media. Several codecs may be allowed for one media. The session setup may, for example, conclude that both AMR and AMR-WB are allowed for speech in the session. The codec may also include several codec modes. For example, AMR defines 8 codec modes. Each codec mode has its own bit rate (12.2, 10.2, 7.95, 7.4, 6.7, 5.9, 5.15 and 4.75 kbps). Some video codecs instead define 'profiles' and 'levels' which determines how the video should be encoded.

What payload format to use. Each codec has its own payload format. Some payload formats define several variants of the payload format. For example: for AMR and AMR-WB, the payload format defines both a bandwidth-efficient format and an octet-aligned format.

How codec mode switching may be done, if the encoders are free to switch to whatever mode that is negotiated and at any point in time. For inter-working scenarios with circuit switched services, for example AMR in UTRAN and GERAN, such codec mode switching may need to be restricted to match the limitations that exist in the UTRAN and/or GERAN CS networks.

The media can thus normally be configured in several different ways. One RTP Payload Type number is defined for each configuration that is allowed in the session. Notice that one can expect several configurations for each media.

The Media input is the media (speech, audio, video, text, etc. . . . ) from UE A. Alternatively, the media could be media from another announcement server as previously mentioned. This media will be interrupted by the announcement. RTP is normally used for transporting the media.

The Media output is the media that is sent to UE B.

UE B sends quality Feedback or adaptation requests to UE A. The quality feedback is typically sent with RTCP and is usually in the form of metrics (packet loss rate, jitter, etc. . . . ). Examples of adaptation requests are: codec mode request, frame aggregation request, redundancy request and intra-refresh of video frames. The feedback is used by the sender (UE A) to adapt bit rate, packet rate and redundancy in order to reduce the impact of transport impairments on the media.

Notice that one does not know if the transport limitation that triggers the adaptation is in-between UE A and the announcement server or if it is in-between the announcement server and UE B. But to minimize the risk that the announcement is severely damaged by any transport impairments between the server and UE B, it is beneficial that the announcement is encoded and formatted in the same way as the media from UE A.

The Session and Media analyzer analyses the session setup and/or the media and/or the media feedback to detect the properties of the input media and the transport format that are currently used. Examples of detected properties are:

Media type(s)

Codec(s), codec rate(s) or codec mode(s), frame aggregation, redundancy, etc. . . .

Payload format(s)

The sound level, the volume, of the media. This probably requires decoding the media. To avoid executing a decoder all the time, this analysis should be done infrequently, preferably only once or a few times during the session.

If the media is idle, for example silence, background noise, blank picture, etc. . . . One way to detect this is to verify if SIP UPDATE frames are currently being transmitted, which means that the RTP packet needs to be parsed (or at least the size needs to be checked) but this does not require decoding the media.

If the media is active, for example active speech, moving images, etc. . . . , if so then if:
 The media is building up or has started recently, for example closely after a speech onset.
 If the media is fading out, this happens at the end of sentences and words.

Note that not all parts of this analysis need to be performed continuously, or at all, depending on the circumstances. Some parts apply only to the session setup and when the session is re-negotiated while other parts are preferably monitored during the session (more or less frequently). Some parts of this analysis may require decoding the RTP packets.

The Media database contains the actual announcement media (speech, audio, video, pictures, etc. . . . )

The Media encoder and modifier has the capabilities to encode and/or format the media similarly to the media from UE A, for example:
 It may use different codecs (AMR, AMR-WB, H.263 [9], H.264 [10], etc. . . . ).
 It may modify the acoustic bandwidth (filter to narrowband, filter to wideband, bandwidth extension, screen size, apply fade-in and fade-out, etc. . . . ).
 If idle periods (silence, blank pictures) should be added in the beginning and/or in the end).
 It may also add codec homing information to the beginning and the end of the announcement to force reset in the decoder.
 Adjust the volume level.
 Use different payload formats.
 Apply frame aggregation and redundancy, if used by UE A.

The Announcement command informs the announcement server about:
 What announcement to use.
 The urgency of the announcement, i.e. how important it is to present the announcement immediately to the user or if the announcement can be delayed for a while.

The List of possible media modification methods is a description of what media modification method that is suitable for each condition (as determined by the media analyzer. Examples of different actions that are suitable for different conditions are described below.

The Controller receives the announcement command and information about how the media is currently formatted in the session between UE A and UE B.
 The controller determines how the media should be encoded, if it should be modified in any way before sending it and how the encoded media should be formatted in the RTP packets. This information is sent to the media encoder and modifier unit.
 The controller also determines when the media from UE A will be interrupted and when the announcement media will be inserted.
 If the urgency is high, then it should interrupt the media from UE A immediately or with shortest possible delay.
 If the urgency is low, then it should wait until it detects an idle period in the media form UE A.

The announcement command also triggers announcement. This trigger may originate from several different places, as exemplified in the background section. Additional examples include a telephone operator that may want to interrupt a call to inform one of the parties that an urgent call is waiting, or a network operator that may want to provide a "smooth interruption". For example, when one of the parties moves out of coverage the operator may want to insert an announcement of the type "The other person has moved out of coverage" instead of simply interrupting the service.

Exemplary Media Encoding and Modification Methods

Encoding and Transport Formats

The controller should match the encoding and transport formats to that of the current media that is sent between UE A and UE B.

The controller should select the same codec and codec modes/rates that are currently used in the session.
If the announcement media has higher acoustic bandwidth, then it should be band-pass filtered to match the selected codec.
If the announcement media has lower acoustic bandwidth, then bandwidth extension should be applied.
If the exact same codec or codec mode/rate cannot be selected, then it should select a codec with similar properties (acoustic bandwidth, bit rate, frame rate, encoding quality, etc. . . . ).

The controller should select the same frame aggregation (number of frames per packet) and redundancy format (repeat a frame in several RTP packets) that is currently used in the session.

The controller should select the same transport format (RTP payload type, payload format, payload format version) that is currently used in the session.

Selecting proper encoding formats increases the chances that the two media sound virtually the same.

Selecting proper transport format increases the chances that the announcement media will not be severely impacted by transport impairments.

Smooth Transition When Switching

If the announcement message is less important and if the announcement server manages to hold the message until it has detected an idle period in the speech, then no special smoothing should be required when switching in-between the media from the different sources.

If the announcement message is very important the announcement server will normally interrupt the media from UE A even if it is active. In this case, the announcement server should:

Apply fade-out of the media from UE A (this may not always be possible)
Format the announcement media so that this will trigger a reset of the decoder states or ECU actions for several frames to obtain a gradual reset of the decoder, for example by:
For AMR, this can be done by inserting codec homing frames before the announcement media starts. Other codecs may not have similar features.
Ensure that the CRC or checksum verification will fail. All payload formats do not include such information. This solution needs to be repeated for a number of frames in order to ensure that the signal is muted well enough.
Set Bad Frame Indicator (BFI) bits, so that this will trigger ECU actions in the receiver. All payload formats do not include such information. This solution needs to be repeated for a number of frames in order to ensure that the signal is muted well enough.
Insert dummy or idle frames (NO_DATA, silence, blank pictures). NO_DATA is not defined for all codecs. The announcement server may have to encode silence frames in order to achieve this. This solution needs to be repeated for a number of frames in order to ensure that the signal is muted well enough.

Since the existence of these methods depends on the codec, the controller needs to decide what actions that applies to the currently used codec.

Adjust the volume of the announcement media so that it is similar to that of the media from UE A.

Apply fade-in for the announcement media.

Similar actions should be done when the transmission of the announcement media has been completed and when switching back to the media from UE A.

Notice that smoothing may be needed in either the start or the end of the announcement media or both, or not needed at all.

As already explained, the invention is not only limited to announcements inserted by the telecom network. Similar announcements are also present in most commercial service desks ("Press 1 to continue ordering your ticket. Press 2 change dates. Press 3 to talk with our sales personnel"). In this case, the announcements come from the remote "user" and the remote "user" may switch between pre-recorded messages and human talkers.

Distortions due to switching between media may be completely removed or at least reduced. The format of the announcement media is preferably matched to the format of the media that is used in the conversation. This gives a more pleasant transition between the media from UE A and the announcement media.

There is also a complexity advantage in the receiving UE, both regarding MIPS and memory, since it does not have to have several active codec instances executing in parallel.

It should also be understood that the invention is not limited to RTP media streams, nor to the use of UDP as the transport protocol, nor to the use of SIP for session setup.

The embodiments described above are merely given as examples, and it should be understood that the present invention is not limited thereto. Further modifications, changes and improvements which retain the basic underlying principles disclosed and claimed herein are within the scope of the invention.

ABBREVIATIONS

ADPCM Adaptive Differential PCM
AMR Adaptive Multi-Rate
AMR-WB AMR-WideBand
BFI Bad Frame Indicator
CRC Cyclic Redundancy Code
CS Circuit Switched
ECU Error Concealment Unit
EVRC Enhanced Variable Rate Codec
GERAN GSM Edge Radio Access Network
GSM Global System for Mobile communications
GSM-EFR GSM Enhanced Full Rate
IMS IP Multimedia Subsystem
IP Internet Protocol
MIPS Million Instructions Per Second
MMTel Multi Media Telephony
MRFP Media Resource Function Processor
PCM Pulse Code Modulation
PBX Private Branch exchange
PS Packet Switched
RTCP Real-Time Control Protocol
RTP Real-Time Protocol
SDP Session Description Protocol
SIP Session Initiation Protocol
TDM Time Division Multiplexing UDP User Datagram Protocol
UMTS Universal Mobile Telecommunication System
UTRAN UMTS Terrestrial Radio Access Network
UE User Equipment
VoIP Voice over IP

REFERENCES

[1] RFC 3550, "RTP: A Transport Protocol for Real-Time Applications", H. Schulzrinne, S. Casner, R. Frederick and V. Jacobson.
[2] 3GPP TS 23.228, "IP Multimedia Subsystem (IMS), Stage 2".
[3] RFC 3261, "SIP: Session Initiation Protocol", RFC 3261, June 2002. Rosenberg, J., Schulzrinne, H., Camarillo, G., Johnston, A., Peterson, J., Sparks, R., Handley, M., and E. Schooler,
[4] ITU-T Recommendation G.711, "Pulse Code Modulation (PCM) of Voice Frequencies".
[5] ITU-T Recommendation G.726, "40, 32, 24, 16 kbit/s Adaptive Differential Pulse Code Modulation (ADPCM)".
[6] 3GPP TS 26.114. "IP Multimedia Subsystem (IMS); Multimedia Telephony; Media handling and interaction".
[7] 3GPP TS 26.071, "Mandatory Speech Codec speech processing functions; AMR Speech CODEC; General description".
[8] 3GPP TS 26.171, "Speech codec speech processing functions; Adaptive Multi-Rate-Wideband (AMR-WB) speech codec; General description".
[9] ITU-T Recommendation H.263, Video coding for low bit rate communication.
[10] ITU-T Recommendation H.264, Advanced video coding for generic audiovisual services.

The invention claimed is:

1. A method for switching between user media and announcement media intended for a first network element in a communication network, said user media coming from a second network element and said announcement media coming from a third network element, wherein said method comprises the steps of:
   determining a configuration of said user media based on monitoring user communication to detect a currently used configuration of said user media, wherein said configuration of said user media is based on properties of a payload of said user media;
   determining a configuration of said announcement media to be presented to said first network element based on the determined user media configuration, wherein said configuration of said announcement media is based on properties of a payload of said announcement media;
   configuring said announcement media according to said announcement media configuration; and
   sending said configured announcement media to said first network element.

2. The method of claim 1, wherein said step of determining a configuration of said user media comprises the step of determining a codec configuration of said user media, and said step of determining a configuration of said announcement media is based on matching codec configuration of said announcement media to the codec configuration of said user media.

3. The method of claim 2, wherein said step of determining a configuration of said user media further comprises the step of determining transport format configuration of said user media, and said step of determining a configuration of said announcement media is further based on matching transport format configuration of said announcement media to the transport format configuration of said user media.

4. The method of claim 2, wherein said step of determining a configuration of said user media further comprises the step of determining frame aggregation and redundancy format configuration of said user media, and said step of determining a configuration of said announcement media is further based on matching frame aggregation and redundancy format configuration of said announcement media to the frame aggregation and redundancy format configuration of said user media.

5. The method of claim 2, wherein said step of determining a codec configuration of said user media comprises determination of type of codec and codec mode, and also codec mode switching capabilities.

6. The method of claim 1, wherein a communication session is setup for user media between said first network element and said second network element, and said step of sending said configured announcement media to said first network element comprises the step of inserting said configured announcement media in said communication session.

7. The method of claim 1, wherein said step of determining a configuration of said user media comprises the steps of:
   monitoring session setup of a communication session for user media between said first network element and said second network element to identify multiple valid user media configurations; and
   determining a configuration of said user media based on monitoring communication between network elements in said session to detect a currently used one of said valid user media configurations.

8. The method of claim 7, wherein said step of monitoring communication between network elements comprises the step of detecting information for adaptation of the configuration of said user media to properly determine said configuration of said announcement media.

9. The method of claim 6, wherein a timing for inserting said announcement media in said session is determined based on the urgency of the announcement, and said configured announcement media is inserted in said session according to said determined timing.

10. The method of claim 6, further comprising the step of applying a transition procedure for smooth transition between said user media and said announcement media when said announcement media is inserted in said session.

11. The method of claim 1, wherein said first network element includes user equipment of a first user and said second network element includes user equipment of a second user, and said third network element includes an announcement server.

12. The method of claim 11, wherein said announcement server is located at one of the network side and the user side.

13. The method of claim 11, wherein said users are involved in a multimedia session using Real-Time Protocol (RTP) for media transport and Session initiation Protocol (SIP) for session control.

14. A system for switching between user media and announcement media in a communication session in a communication network, wherein said system comprises:
   a memory; and
   a processor operable, when executing instructions stored in the memory, to determine a configuration of said user media for said communication session based on monitoring user communication to detect a currently used configuration of said user media, wherein said configuration of said user media is based on properties of a payload of said user media;

the processor further operable, when executing instructions stored in the memory, to determine a configuration of said announcement media to be inserted in said session based on the determined user media configuration, wherein said configuration of said announcement media is based on properties of a payload of said announcement media;

the processor further operable, when executing instructions stored in the memory, to configure said announcement media according to said announcement media configuration; and the processor further operable, when executing instructions stored in the memory, to insert said configured announcement media in said session.

15. The system of claim 14, wherein said processor is further operable, when executing instructions stored in the memory, to determine a codec configuration of said user media in said session, and to determine a configuration of said announcement media is configured for matching codec configuration of said announcement media to the codec configuration of said user media.

16. The system of claim 15, wherein said processor is further operable, when executing instructions stored in the memory, to transport format configuration of said user media in said session, and to match transport format configuration of said announcement media to the transport format configuration of said user media.

17. The system of claim 15, wherein said processor is further operable, when executing instructions stored in the memory, to determine type of codec and codec mode.

18. The system of claim 14, wherein said processor is further operable, when executing instructions stored in the memory, to:

monitor the session setup to identify multiple valid user media configurations; and monitor communication between users in said session to detect a currently used one of said valid user media configurations.

19. The system of claim 14, wherein said processor is further operable, when executing instructions stored in the memory, to insert said announcement media in said session based on the urgency of the announcement, and wherein said processor is operable, when executing instructions stored in the memory, for inserting said announcement media according to said determined timing.

20. The system of claim 14, wherein said processor is further operable, when executing instructions stored in the memory, to apply a transition procedure for smooth transition between said user media and said announcement media when said announcement media is inserted in said session.

21. The system of claim 14, wherein said communication session relates to communication between user equipment of different users, and said announcement comes from an announcement server that is located at one of the network side and the user side.

22. An announcement server for a communication network, said announcement server comprising:

a memory; and a processor operable, when executing instructions stored in the memory, to obtain media configuration information representative of a currently used configuration of user media in a communication session in said network, wherein said configuration of said user media is based on properties of a payload of said user media;

the processor further operable, when executing instructions stored in the memory, to configure announcement media to be inserted in said session based on said media configuration information;

the processor further operable, when executing instructions stored in the memory, to insert said configured announcement media in said session.

* * * * *